United States Patent
Chi et al.

(10) Patent No.: US 7,324,338 B1
(45) Date of Patent: Jan. 29, 2008

(54) HEAT DISSIPATING APPARATUS OF A COMPUTER SYSTEM

(75) Inventors: Yen-Shu Chi, Taipei County (TW); Tony Zan-How Ou, Taipei County (TW)

(73) Assignee: Silver-Stone Technology Co., Ltd., Jhonghe, Taipei County (TW)

( * ) Notice: Subject to any disclaimer, the term of this patent is extended or adjusted under 35 U.S.C. 154(b) by 0 days.

(21) Appl. No.: 11/511,283

(22) Filed: Aug. 29, 2006

(51) Int. Cl.
*H05K 7/20* (2006.01)
*H05K 5/00* (2006.01)

(52) U.S. Cl. .............. 361/695; 361/687; 361/692; 361/694; 454/184

(58) Field of Classification Search ........ 361/687, 361/690, 692, 694–695; 165/80.3, 121–122; 454/184; 312/223.2
See application file for complete search history.

(56) References Cited

U.S. PATENT DOCUMENTS

| | | | | |
|---|---|---|---|---|
| 5,751,549 A * | 5/1998 | Eberhardt et al. | .......... | 361/687 |
| 6,130,819 A * | 10/2000 | Lofland et al. | ............ | 361/695 |
| 6,373,697 B1 * | 4/2002 | Lajara et al. | ............... | 361/687 |
| 6,414,845 B2 * | 7/2002 | Bonet | .......................... | 361/695 |
| 6,542,362 B2 * | 4/2003 | Lajara et al. | ............... | 361/687 |
| 6,715,539 B2 * | 4/2004 | Bianco | ........................ | 165/122 |
| 7,209,352 B2 * | 4/2007 | Chen | .......................... | 361/695 |
| 2007/0206353 A1 * | 9/2007 | Boone et al. | ............... | 361/694 |

OTHER PUBLICATIONS

McBride et al., IBM Technical Disclosure Bulletin, vol. 33, No. 10A, Mar. 1991, pp. 51-53.*

* cited by examiner

*Primary Examiner*—Jayprakash Gandhi
*Assistant Examiner*—Robert J Hoffberg
(74) *Attorney, Agent, or Firm*—Bacon & Thomas, PLLC

(57) ABSTRACT

A heat dissipating apparatus of a computer system is used for a first heat generating component (such as an interface card and a display card) of the computer system without being interfered by a second heat generating component (such as a hard disk drive and an optical disk drive) of the heat dissipating apparatus. The heat dissipating apparatus has a rack installed between the first and second heat generating components, corresponding openings on both sides of the rack, a fan between the openings, and holes disposed on the casing and corresponding to the openings of the rack. The fan is rotated to drive external cold air into the casing through the openings of the rack from the holes of the casing and blown at the first heat generating component directly to improve the heat dissipating effect without being interfered by the second heat generating component in the casing.

5 Claims, 5 Drawing Sheets

HEAT DISSIPATING APPARATUS OF A COMPUTER SYSTEM

BACKGROUND OF THE INVENTION

1. Field of the Invention

The present invention relates to a heat dissipating apparatus of a computer system, and more particularly to a heat dissipating apparatus of a first heat generating component (such as an interface card and a display card, etc) in a computer system without interfering a second heat generating component (such as a storage device, a hard disk drive and an optical disk drive, etc) in the computer system capable of driving external cold air directly into the computer system and blown at the first heat generating component to improve the heat dissipating effect.

2. Description of the Related Art

Computers become increasingly popular and computer users have high demands on the functions of a computer, and thus computer manufacturers keep on introducing various image processing software programs with complicated functions, and the demands for the operating speed of the computer and the accessing speed of the memory become higher. However, computer manufacturers are facing with a problem of requiring complicated interface cards, display cards or other electronic components (such as a hard disk) to go with the high-speed performance, in addition to the increasingly high speed of the microprocessor of the computer system, and thus the quantity of heat produced by the interface cards, display cards, the hard disks or other components become larger. Therefore, the subject of finding a way to effectively dissipate the heat demands immediate attentions and feasible solutions.

Referring to FIG. 1, a prior art heat dissipating apparatus has a casing and a fan installed at the rear end of the casing and disposed together with a power supply, such that when the heat is dissipated, the fan drives external cold air to carry out the heat produced by heat sources in the casing. Since the fan is installed at the rear/front end of the casing, and the front/rear end of the casing has air inlets, and the front/rear ends of the casing have various different heat generating components such as interface cards, display cards and hard disks, therefore the cold air entering from the front end or the rear end will pass through the heat generating components such as the hard disks, interface cards and display cards, etc and carry the heat away by the fan. For instance, a general computer system usually installs the hard disk at the front end of the casing, so that when the external cold air enters into the casing, the temperature of the air passing through the hard disk will rise. The hot air passing through the heat generating components such as the display cards and interface cards cannot effectively lower the temperature of the display cards or other heat dissipating components, and thus the prior art heat dissipating apparatus still require further improvements.

SUMMARY OF THE INVENTION

Therefore, it is a primary objective of the present invention to overcome the shortcomings of the prior art by providing a heat dissipating apparatus of a computer system, wherein a rack is installed between a first heat generating component (such as a computer, an interface card and a display card, etc) and a second heat generating component (such as storage device, a hard disk drive and an optical disk drive, etc) in a computer casing, and both sides of the rack have corresponding openings, and a fan is installed between the openings, and corresponding holes are disposed on the casing and at the positions corresponding to the openings on both sides of the rack. The fan on the rack is rotated to drive external cold air directly from the holes on the casing into the casing through the openings on both sides of the rack and the air is blown directly at the first heat generating component to improve the heat dissipating effect without being interfered by the second heat generating component in the casing.

Another objective of the present invention is to provide a heat dissipating apparatus of a computer system wherein its fan has a filter for filtering the dust in the external air.

BRIEF DESCRIPTION OF THE DRAWINGS

The objectives, shape, structure, apparatus, characteristics and effects will become apparent by the detail description together with the accompanying drawings as follows.

DETAILED DESCRIPTION OF THE PREFERRED EMBODIMENTS

Figure 1:
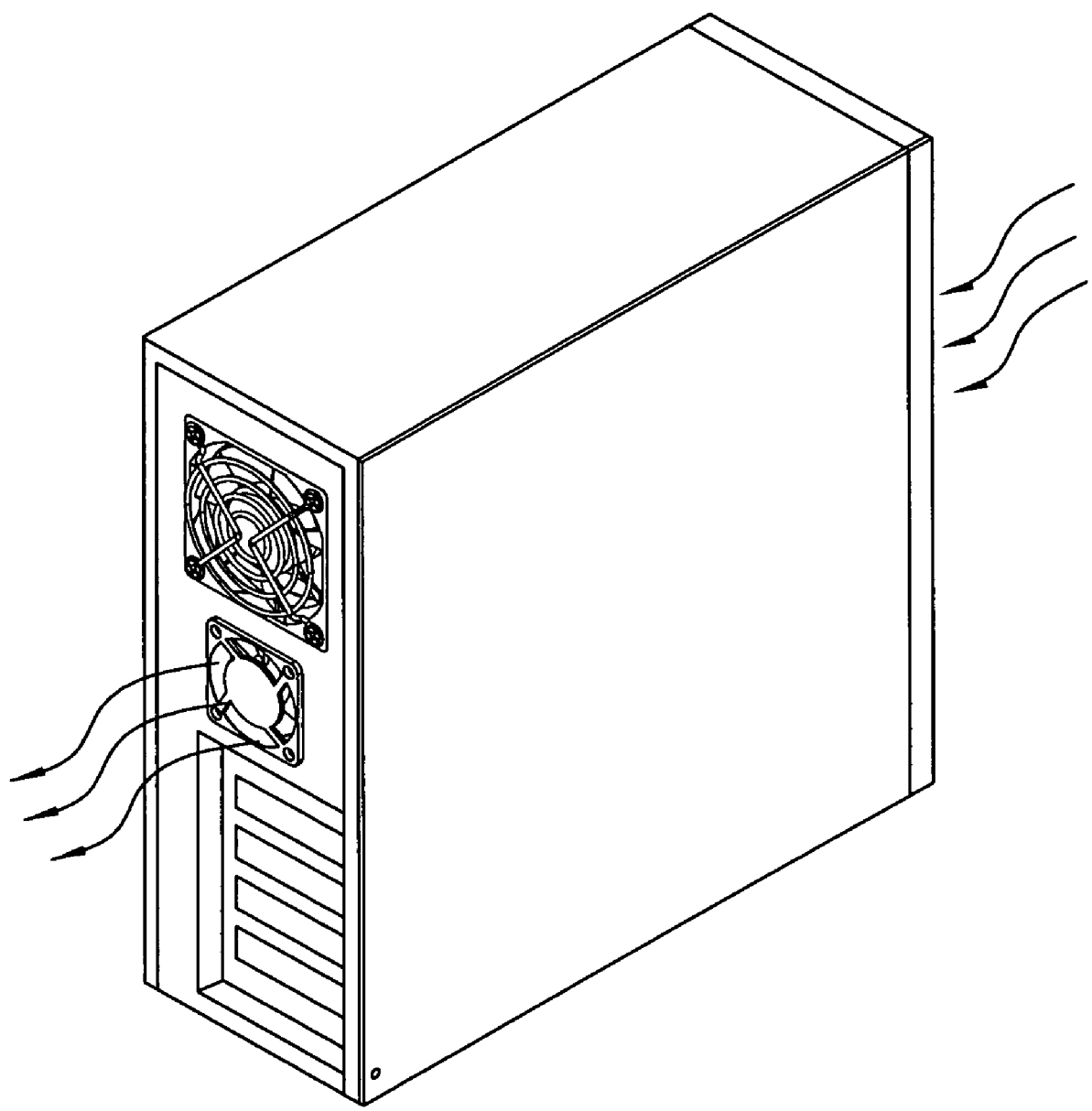
FIG. 1 is a schematic view of a prior art apparatus.
Figure 2:
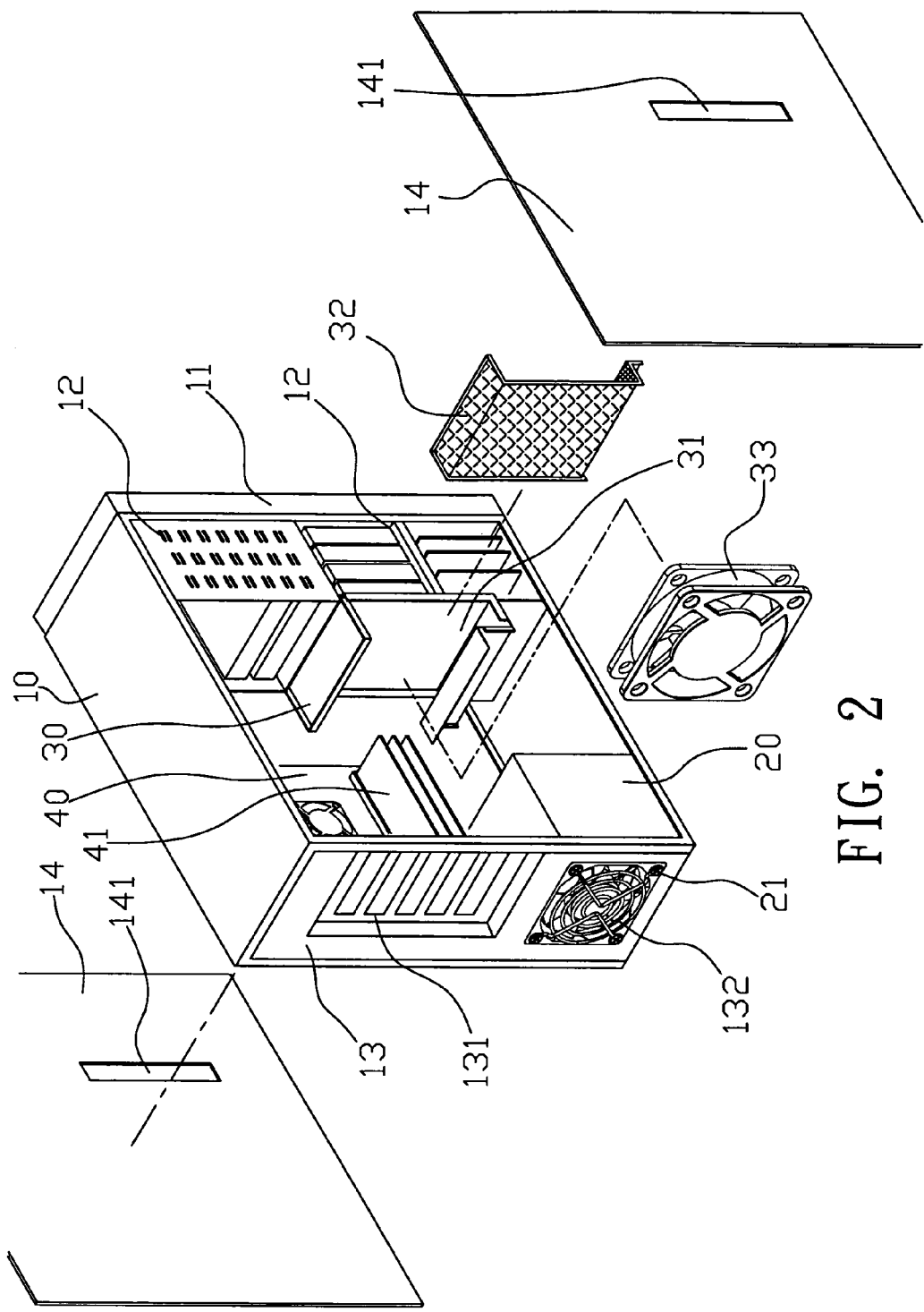
FIG. 2 is an exploded view of the present invention.
Figure 3:
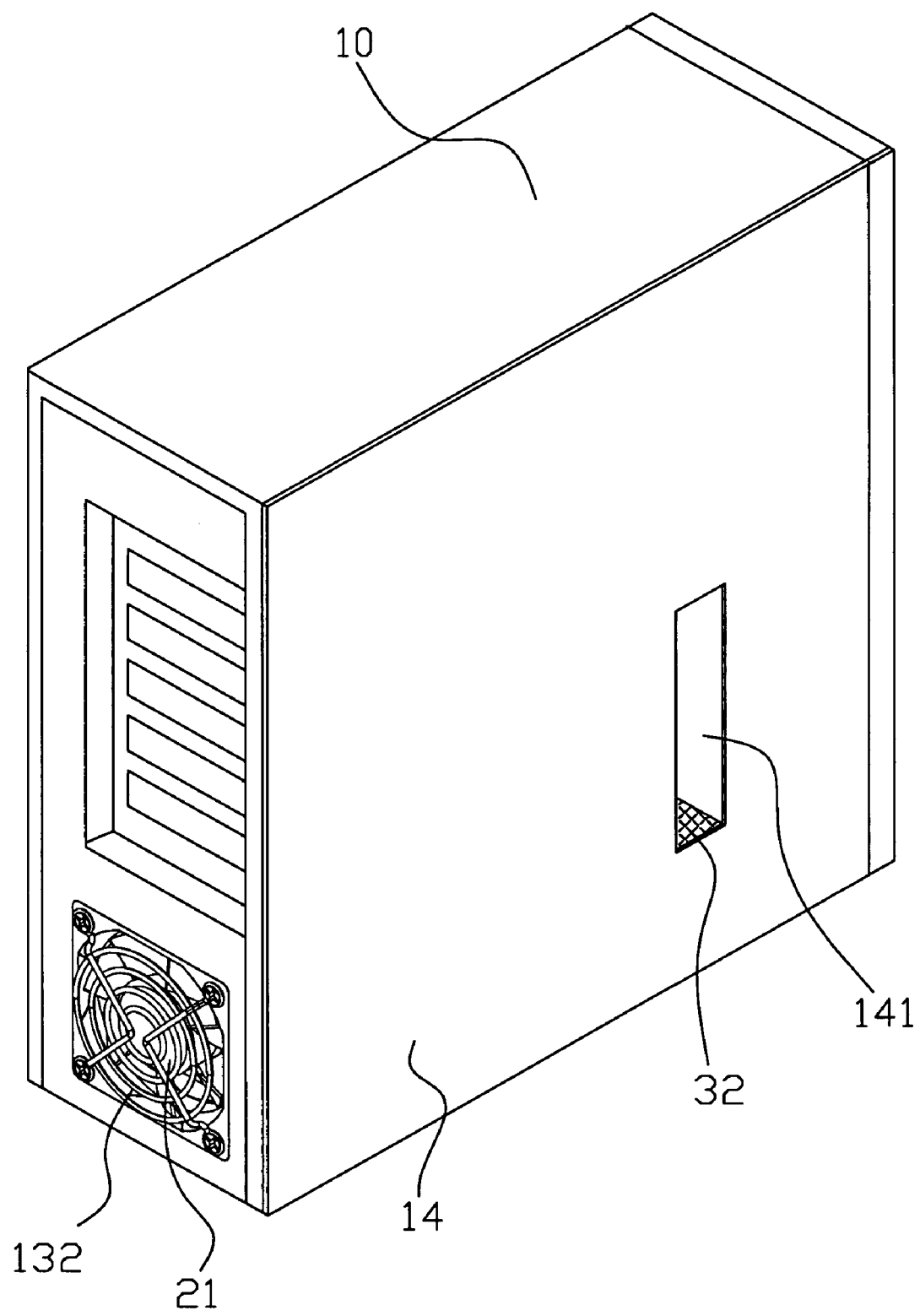
FIG. 3 is a perspective view of the present invention.

Referring to FIGS. 2 and 3 for a heat dissipating apparatus of a computer system of the present invention, the apparatus comprises a casing 10 of a computer which is a tower desktop computer, a front panel 11 disposed at the front side of the casing 10, a plurality of frames 12 disposed proximate to the front panel 11 of the casing 10 for installing a second heat generating component (such as a storage device, a hard disk drive, an optical disk drive, etc), a rear panel 13 disposed at the rear side of the casing 10, a plurality of slots 131 on the rear panel 13, a mesh 132 disposed on the rear panel 13 and corresponding to a fan 21 which is installed together with a power supply 20 in the casing 10, and a side panel 14 disposed separately on both sides of the casing 10, wherein one side panel 14 has a first heat generating component, and the first heat generating component is a motherboard 40, a central processing unit (CPU) of the motherboard 40, or different interface cards 41 (such as a display card).

Further, a rack 30 is installed between the first and second heat generating components (which are a storage device and an interface card in this embodiment respectively) of a casing 10; corresponding openings 31 are disposed on both sides of the rack 30; a filter 32 is disposed between the openings 31, and it is an n-shape filter for filtering impurities in the air; a fan 33 is installed at a position corresponding to the filter 32 in the rack 30, and the side panels 14 on both sides of the casing 10 have corresponding holes 141 disposed at positions corresponding to the openings 31 on both sides of the rack 30.

Figure 4:
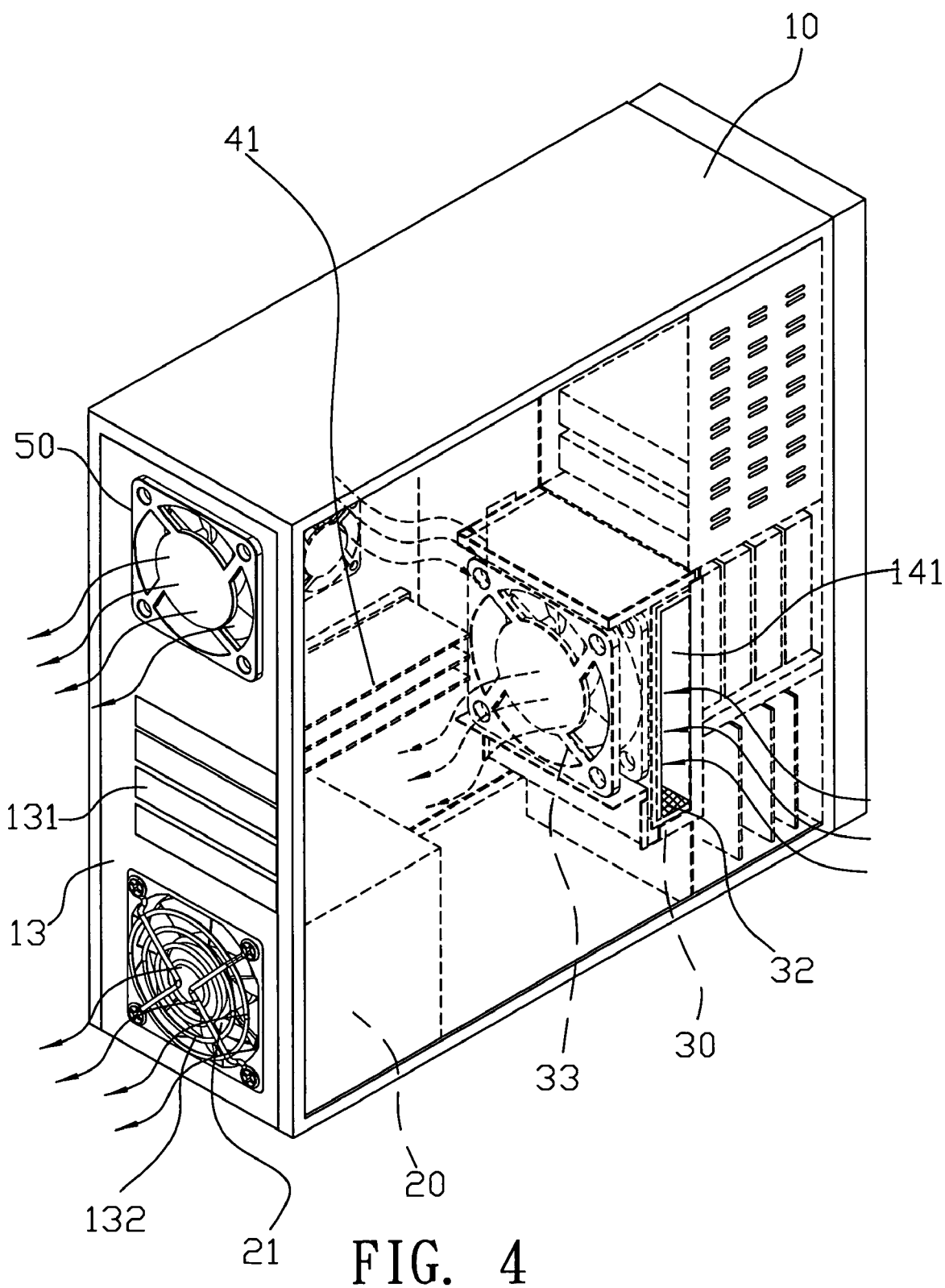
FIG. 4 is a schematic view of the operation of the present invention.

Referring to FIGS. 3 and 4, the fan 33 on the rack 30 is rotated to drive external air into the casing 10 from the holes 141 on both sides of the side panels 14. After the impurities of the air is filtered by a filter 32, the air is sent to the position of the interface card 41 by the fan 33, so that the heat generated by the interface card 41 is carried away by the air and dissipated to the outside of the casing 10 by a fan 21 of the power supply 20. Therefore, the fan 33 is rotated to drive external cold air into the casing 10 from the holes 141 without being interfered by the heat generating components such as a hard disk, and the air is blown directly at the position of a specific heat generating component to improve the heat dissipating effect.

Figure 5:
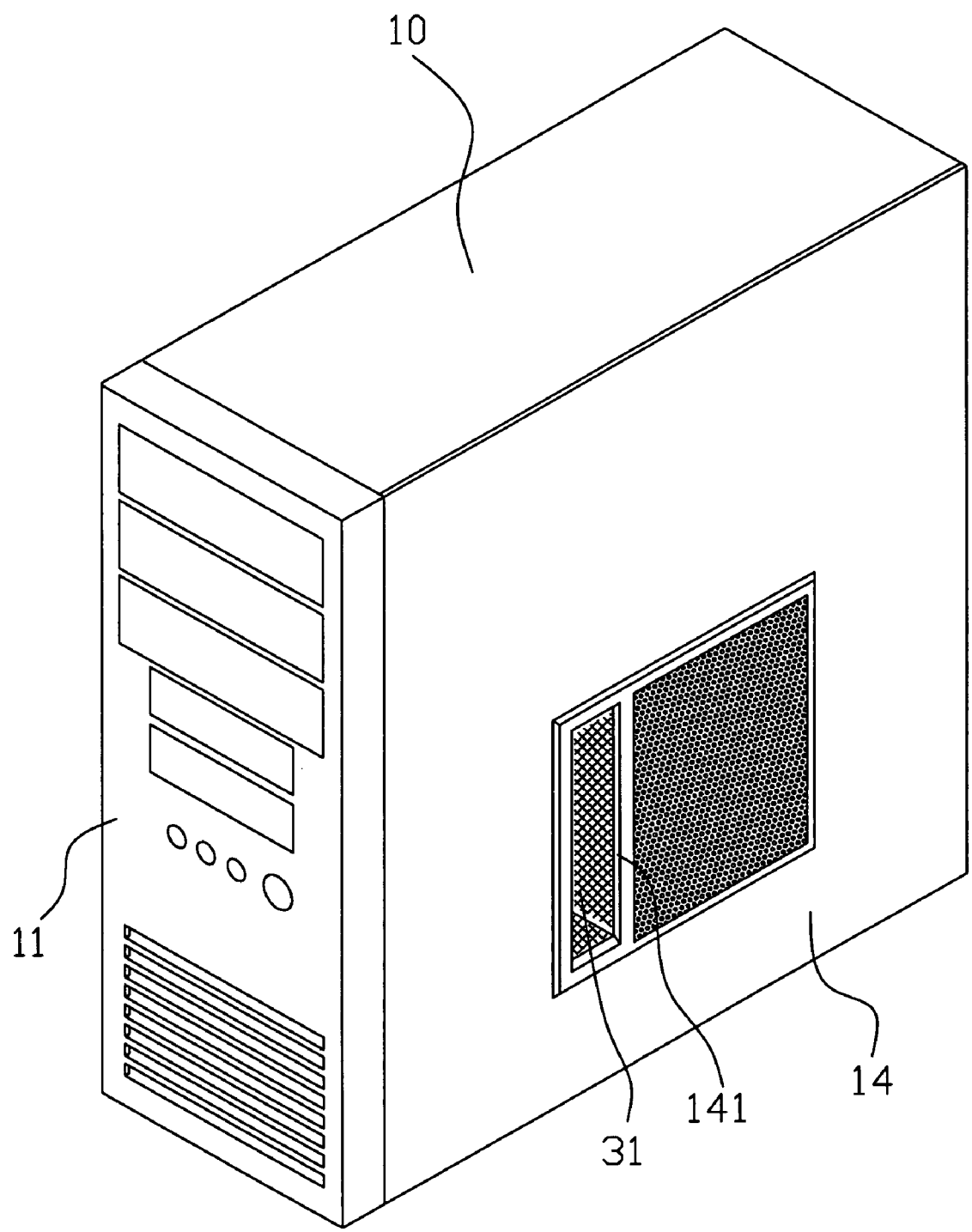
FIG. 5 is a perspective view of another preferred embodiment of the present invention.

Referring to FIGS. 4 and 5, the casing 10 can add a set of fan 50 on the rear panel 13 to improve the heat dissipating effect and increase the area of the holes on the side panels 14 to increase the airflow entering into the casing 10.

While the invention has been described by means of a specific numerous modifications and variations could be made thereto by those skilled in the art without departing from the scope and spirit of the invention set forth in the claims.

In summation of the above description, the present invention definitely achieves the expected objective and provides an engraving method for a laser engraver to enhance the performance over the prior art. The invention further complies with the patent application requirements and is duly filed for the patent application.

What is claimed is:

1. A heat dissipating apparatus of a computer system, comprising: a casing, having intake holes disposed on two side panels between said rear panel and said front panel; a first heat generating component and a second heat generating component, installed in said casing and disposed proximate to said rear panel and said front panel respectively, wherein said first heat generating component is disposed rearward of said intake holes and said second heat generating component is disposed forward of said intake holes; a rack, installed in said casing and having corresponding openings disposed on both lateral sides of said rack and corresponsive to said intake holes of said casing; and a fan, installed between two corresponding openings of said rack; thereby, said fan rotates to drive external cold air to enter directly into said casing from said intake holes of said casing without being interfered by said second heat generating component, and said cold air can be blown directly at said first heat generating component to improve the heat dissipating effect.

2. The heat dissipating apparatus of a computer system of claim 1, wherein said first heat generating component is an interface card.

3. The heat dissipating apparatus of a computer system of claim 1, wherein said second heat generating component is a storage device.

4. The heat dissipating apparatus of a computer system of claim 1, wherein said computer is a tower desktop computer.

5. The heat dissipating apparatus of a computer system of claim 1, wherein said casing includes a filter disposed at said intake holes of said casing.

* * * * *